J. N. HAWKINS.
OIL CUP.
APPLICATION FILED MAY 7, 1908.
960,172.
Patented May 31, 1910.
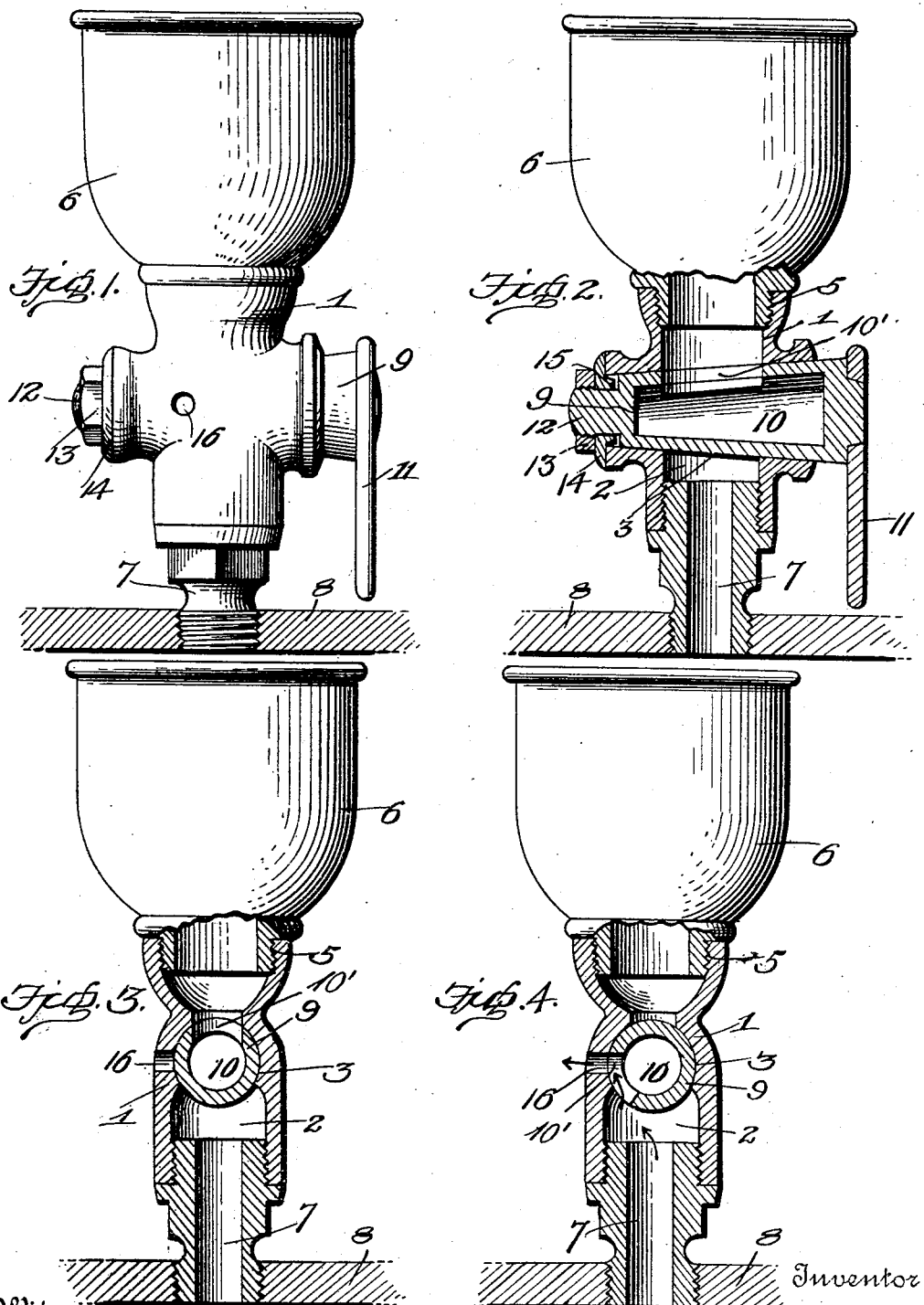
Witnesses
C. C. Hunt.
C. H. Giesbauer.
Inventor
Joseph N. Hawkins
By H. B. Willson & Co.
Attorneys

UNITED STATES PATENT OFFICE.

JOSEPH N. HAWKINS, OF MANNINGTON, WEST VIRGINIA.

OIL-CUP.

960,172.  Specification of Letters Patent.  Patented May 31, 1910.

Application filed May 7, 1908. Serial No. 431,389.

*To all whom it may concern:*

Be it known that I, JOSEPH N. HAWKINS, a citizen of the United States, residing at Mannington, in the county of Marion and State of West Virginia, have invented certain new and useful Improvements in Oil-Cups; and I do declare the following to be a full, clear, and exact description of the invention, such as will enable others skilled in the art to which it appertains to make and use the same.

This invention relates to new and useful improvements in oil cups designed for use in connection with steam engines by means of which a certain quantity of the lubricant may be supplied to the slide valve or other parts of the engine that require lubrication.

With these and other objects in view, the invention consists of certain novel features of construction, combination and arrangement of parts, as will be more fully described and particularly pointed out in the appended claim.

In the accompanying drawings, Figure 1 is a side elevation of an oil cup constructed in accordance with the invention as applied to one wall of the steam chest of an engine; Fig. 2 is a central vertical section of the oil cup; Fig. 3 is a similar view taken at right angles to Fig. 2; and Fig. 4 is a view similar to Fig. 3 with the oil chamber of the valve member in registration with the steam outlet port in the casing.

In the embodiment illustrated, the device comprises an upright two way valve casing 1 having the usual vertical and transverse bores 2 and 3. The upper end of the casing is internally screw threaded, as at 5, and constitutes a socket in which is screwed the lower end of a suitable oil cup 6 in which is placed the tallow or other lubricant. The lower end of the casing is provided with an externally threaded stem 7 which screws at one end in the vertical bore of the casing and at its other end, into the top wall 8 of the steam chest. A hollow cylindrical valve member 9 is revolubly mounted in the transverse bore of the casing, the interior of said valve member constituting an oil chamber 10, the wall of which is provided with a central longitudinal slot or opening 10' which normally registers with the upper end of the vertical bore 2 of the casing. One end of the valve member is provided with a suitable handle 11 and the opposite end thereof with a threaded stem 12 upon which is screwed a fastening nut 13, a washer 14 formed with an annular rib 15 to seat in the adjacent end of the bore 3 and around the stem 12, having been previously placed in position. In carrying out the objects of the invention, the wall of bore 3 of the casing is provided at a suitable point with a transverse outlet port 16, the purpose of which will be shown.

In practice, the normal position of the valve member 9 is such as to dispose the opening 10' of the oil chamber 10 in registration with the upper end of the bore 2 of the valve casing under which conditions the handle 11 extends downwardly in a vertical plane. Assuming the device to be applied to a steam chest, to supply the slide valve with a quantity of oil or other lubricant, the handle 11 is swung upwardly into vertical position in a plane in alinement with the plane occupied thereby when in its normal position to turn the valve member a half revolution in order to dispose the slot or opening 10' in the wall of the oil chamber 10 in registration with the lower end of the bore 2 in which case the oil passes through the lower portion of the valve casing to the steam chest and lubricates the slide valve. The valve member is next turned into normal position to refill the oil chamber (see Figs. 2 and 3).

It is to be observed that the slot or opening 10' is of such a width as to establish effective communication between the interior of the stem 7 and the outlet port 16, when the valve member is in the position indicated in Fig. 4, thus permitting the steam to blow any settlings out of the interior of the oil chamber, and at the same time providing for the use of the steam as a means for heating the interior of the oil cup in order that the tallow will be more readily melted.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

Having thus described my invention, what I claim as new is:

An oil cup, a two-way valve casing connected to and communicating therewith and having a vertical and a transverse bore intersecting each other, said casing having an outlet port extending through the wall of its transverse bore, a hollow rotary valve plug mounted in said transverse bore and having a longitudinal opening or slot arranged to register with the vertical bore of the casing above the hollow valve plug when said plug is turned into receiving or filling position, said opening being of sufficient width to establish communication between the vertical bore below said plug and said outlet port on the turning of the plug from discharging into filling position, whereby steam is admitted into said valve through said slot-like opening and discharged through said outlet port.

In testimony whereof I have hereunto set my hand in presence of two subscribing witnesses.

JOSEPH N. HAWKINS.

Witnesses:
    JESSE SHIMP,
    THOMAS HAWKINS.